US006345304B1

(12) United States Patent
Dymetman et al.

(10) Patent No.: US 6,345,304 B1
(45) Date of Patent: Feb. 5, 2002

(54) OBTAINING NETWORK ADDRESSES FROM IDENTIFIERS

(75) Inventors: Marc Dymetman, Grenoble (FR); Max Copperman, Santa Cruz, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/276,084

(22) Filed: Mar. 25, 1999

Related U.S. Application Data

(63) Continuation-in-part of application No. PCT/US98/20596, filed on Sep. 30, 1998.

(30) Foreign Application Priority Data

| Apr. 1, 1998 | (GB) | ............................................. 9806973 |
| Apr. 1, 1998 | (GB) | ............................................. 9806977 |
| Apr. 1, 1998 | (GB) | ............................................. 9807001 |

(51) Int. Cl.$^7$ ........................................... G06F 15/173
(52) U.S. Cl. ...................... 709/238; 709/250; 709/219
(58) Field of Search ............................... 709/238, 250, 709/219

(56) References Cited

U.S. PATENT DOCUMENTS

| 5,663,748 A | 9/1997 | Huffman et al. ............. 345/173 |
| 5,708,845 A | 1/1998 | Wistendahl et al. ........ 395/806 |
| 5,727,159 A | 3/1998 | Kikinis ........................ 395/200 |
| 5,729,594 A | 3/1998 | Klingman ................. 379/93.12 |
| 6,021,126 A | * 2/2000 | White et al. ................. 370/352 |
| 6,032,196 A | * 2/2000 | Monier ........................ 709/245 |

OTHER PUBLICATIONS

Arai, Toshifumi et al. "PaperLink: A Technique for Hyperlinking from Real Paper to Electronic Content," Proceedings of CHI 97 Human Factors in Computing Systems, Atlanta, Georgia; Mar. 22–27, 1997, pp. 327–334.

International Search Report for PCT counterpart Application No. PCT/US98/20596 with search date of Jan. 7, 1999 and mailing date of May 4, 1999.

Johnson, Walter et al. "Bridging the Paper and Electronic Worlds: The Paper User Interface," Proceedings of INTERCHI '93, Amsterdam, The Netherlands; Apr. 24–29, 1993, pp. 507–512.

Lamming, Michael G. et al. "Activity–Based Information Retrieval: Technology in Support of Human Memory," in Personal Computers and Intelligent Systems: Information processing 92, Amsterdam, The Netherlands, 1992.

(List continued on next page.)

*Primary Examiner*—John A. Follansbee

(57) ABSTRACT

An identifier of an action that can be produced through a network, such as a page identifier or other substrate identifier with a counterpart digital page accessible through a network, is used to obtain a network address. The identifier is provided to a first machine such as a router, and the first machine uses the identifier to obtain a first network address that is for a set of identifier values that includes the identifier's value. The first network address is then used to provide the identifier to a second machine such as a server. The second machine uses the identifier to obtain a second network address that is for the value of the identifier. The second network address, when provided on the network, produces the action identified by the value of the identifier. The identifier can be read from a coded substrate by image input circuitry and the image signals can be used by a third machine, such as a processor in a pointer, to provide the identifier to the first machine. The pointer's processor can also cache network addresses obtained from the first machine for use with subsequent identifiers in the same set.

13 Claims, 7 Drawing Sheets

OTHER PUBLICATIONS

Robinson, Peter et al. "Animated Paper Documents," Proceedings of Eurographics 1997, Nov. 1997, pp. 655–658.

SödergÅrd, Caj et al. "A Pen Scanner Based System for an Easy Access to Relevant WWW Hyperlinks," TAGA '97 Conference, Quebec, Canada, May 4–7, 1997, Technical Association for Graphic Arts, 1997, pp. 63–82.

Stifelman, Lisa J. "Augmenting Real–World objects: A Paper–Based Audio Notebook," CHI '96, ACM, Apr. 1996, pp. 199–200.

Whittaker, Steve et al. "Filochat: Handwritten Notes Provide Access to Recorded Conversations," Proceedings of the CHI '94 Conference on Human Factors in Computing Systems, Boston, Massachusetts; Apr. 24–28, 1994, pp. 271–277.

* cited by examiner

OBTAINING NETWORK ADDRESSES FROM IDENTIFIERS

This application claims priority under 35 U.S.C. §120 from copending International Application PCT/US98/20596, filed Sep. 30, 1998, with respect to all shared subject matter.

FIELD OF THE INVENTION

The present invention relates to techniques for obtaining network addresses from identifiers.

BACKGROUND OF THE INVENTION

Various techniques have been proposed for operating a machine such as a router to obtain network addresses. A network address can then be used to obtain an associated action, such as access to a World Wide Web page.

SUMMARY OF THE INVENTION

The invention addresses problems that arise in using identifiers to obtain network addresses.

Examples of such identifiers are described in copending, coassigned U.S. Pat. application No. 09/276,085, entitled "Marking Medium Area With Encoded Indentifier for Producing Action Through Network", incorporated herein by reference. As described there, a substrate, such as a sheet or sticker of paper or a document, can bear visible or invisible markings that encode an identifier or the substrate and, in some cases, can also encode locations or zones within the substrate. The markings can, for example, be Xerox Data-Glyphs. Such substrates are referred to hereinafter as "coded substrates".

Each coded substrate can have a digitally-stored counterpart, or "digital page", accessible through a network using an address. The encoded substrate can bear a pid-code (pid stands for page-identifier) that identifies it uniquely world-wide and that could therefore also be used to locate the digital page. In general, the digital page can sit anywhere on a global network. The pid can be encoded in DataGlyphs (visibly or invisibly) on the surface of the page in such a way that a "pointer" equipped with a small camera can recover the pid by looking at a small circular area anywhere on the page. With coded substrates, however, the space needed for encoding on a physical page the network address of the digital page counterpart may be at a high premium.

For a coded substrate implementation, because the pid must be recovered from a small area, it is important that:

1. The pid is encoded using a small number of bits; and
2. The pid can address unambiguously any of a large number of digital pages.

The theoretically optimal scheme that satisfies these conditions is to use a small number of bits for the pid, say 64, and to use the pid to address $2^{64}$ different digital pages. (To give an idea of how big this figure is: If every inhabitant of the Earth produced 80 thousand encoded substrates a day for the next century, a 64-bit pid would be sufficient to uniquely identify each encoded substrate and its counterpart digital page.)

Obviously, with such a scheme, there must be a way to map the pid recovered by the pointer into the network address of the counterpart digital page. Copending, coassigned U.S. Pat. application No. 09/276,085, entitled "Marking Medium Area With Encoded Identifier for Producing Action Through Network", describes a central router that contains a table of pairs (pid, address). The pointer can send a pid to the router and the router can send back the address to which the pointer can then connect to retrieve the relevant digital page.

Centralized routing schemes like this have two problems: First, the router may require huge tables for storing the (pid, address) pairs. Second, the number of requests per day to the router can be very large.

As a result of these problems, centralized routing can incur unrealistic address-storage and traffic-frequency costs at the central router's site.

The present invention provides techniques that alleviate these problems. The techniques obtain a network address using an identifier. The identifier, which could be a page identifier as described above or any other appropriate identifier, indicates a value that identifies an action that can be produced through the network, and is therefore referred to herein as an "action identifier". The techniques employ at least first and second machines. The first machine uses the action identifier to obtain a first network address for a set of two or more identifier values that includes the action identifier's value. The first network address can be used to provide the action identifier to the second machine, which uses the action identifier to obtain a second network address for the action identifier's value. The second network address, when provided on the network, produces the action identified by the value of the action identifier.

In one technique, a method provides the action identifier to the first machine, operates the first machine to obtain the first network address, uses the first network address to provide the action identifier to the second machine, and then operates the second machine to obtain the second network address. This technique divides the address storage requirement between the two machines, and can thus be used to alleviate the problem of address storage costs at a central router site. The first machine need only store sufficient data to obtain a network address for each set of identifier values, and the second machine need only store sufficient data to obtain a network address for its set of identifier values. The first machine can be a router and the second machine can be a server.

In one implementation, the action identifier can be a substrate identifier of a coded substrate, such as a page identifier, and the method can be implemented with a third machine that receives signals from image input circuitry, such as the pointer described above. To provide the action identifier to the first machine, the method can operate the image input circuitry to provide image signals defining an image of a region of the substrate to the third machine, where the region bears markings that encode the substrate identifier. The method can then operate the third machine to use the image signals to obtain the action identifier and use a third network address to provide the action identifier and a return network address to the router; the third network address can be the address of the router. The router can use the return network address to provide the first network address to the third machine, and the method can then operate the third machine to use the first network address to provide the action identifier and the return network address to the server. The server can use the return network address to provide the second network address to the third machine, and the third machine can then use the second network address to produce the action identified by the identifier's value.

In another technique, which also divides the address storage requirement, an apparatus includes connection circuitry for providing a connection to the network and processing circuitry connected for providing signals to and receiving signals from the network through the connection circuitry. The processing circuitry operates to provide the action identifier through the connection circuitry to the first machine connected to the network. In response, the first machine uses the action identifier to obtain the first network address. The processing circuitry then uses the first network address to provide the action identifier through the connection circuitry to the second machine connected to the network. In response, the second machine uses the action identifier to obtain the second network address.

In these techniques, each set of identifier values can be a range of consecutive values, with lower and upper bounds indicated by data in the first machine.

The invention further provides techniques that allow data from the first machine to be stored for subsequent use without again providing an action identifier to the first machine. One such technique provides a method as described above, but in which the first machine also provides set data defining the set of identifier values that includes the action identifier; the third machine stores the set data and the first network address in memory so that it can subsequently access the first network address using any identifier value in the set of identifier values that includes the action identifier. Another such technique provides apparatus as described above, but further including memory; the first machine, in response to the action identifier, provides set data as above, and the processing circuitry of the apparatus stores the set data and the first network address in the memory so that the processing circuitry can subsequently access the first network address using any identifier value in the set of identifier values that includes the action identifier. These techniques make it possible to cache network addresses for frequently or recently encountered sets of identifier values at the client machine, and can thus be used to alleviate the problem of traffic frequency costs at a central router.

The invention is advantageous because it can be used in implementations with smaller and more efficient routing facilities. It can also be applied to capitalize on the tendency of publishers (responsible for printing on coded substrates) to buy coded substrates in bulk, as illustrated by the example below.

For the purpose of this illustration, it is assumed that a single company produces (prints) the coded substrates, i.e. coded sheets of paper, provides the central address routing, and sells the pointers for reading the coded sheets. It is also assumed that this company sells the coded sheets, not directly to end users, but to publishers (for instance book or journal publishers) who sell the printed pages (i.e. after printing with human-readable information, such as the text of an article) to end users. The company selling the coded sheets may thus be able to obtain revenues from several interrelated sources—sales of coded sheets to publishers, sales of central address routing services to publishers or end users, and sales of pointers to end users. The company may also be able to sell a publisher a range of consecutive identifier values, in effect promising to sell coded sheets with identifiers in that range only to that publisher. Then, the company's central router can include an entry so that identifiers in the range are always mapped to the network address of the publisher's server, so that the publisher can determine what actions are provided in response to those identifiers.

The invention is also advantageous because it can be implemented such that no address space is lost. For example, 64 bits of data encoded on a substrate can allow addressing of any of $2^{64}$ digital pages.

Further advantages of the invention are that it allows a small number of bits encoded on the page to address a large number of digital pages, that it can be implemented to reduce or minimize hits on a central router, and that, in contrast with hierarchical internet addresses, no redundancy in the address codes is needed.

The following description, the drawings, and the claims further set forth these and other aspects, objects, features, and advantages of the invention.

DETAILED DESCRIPTION

Figure 1:
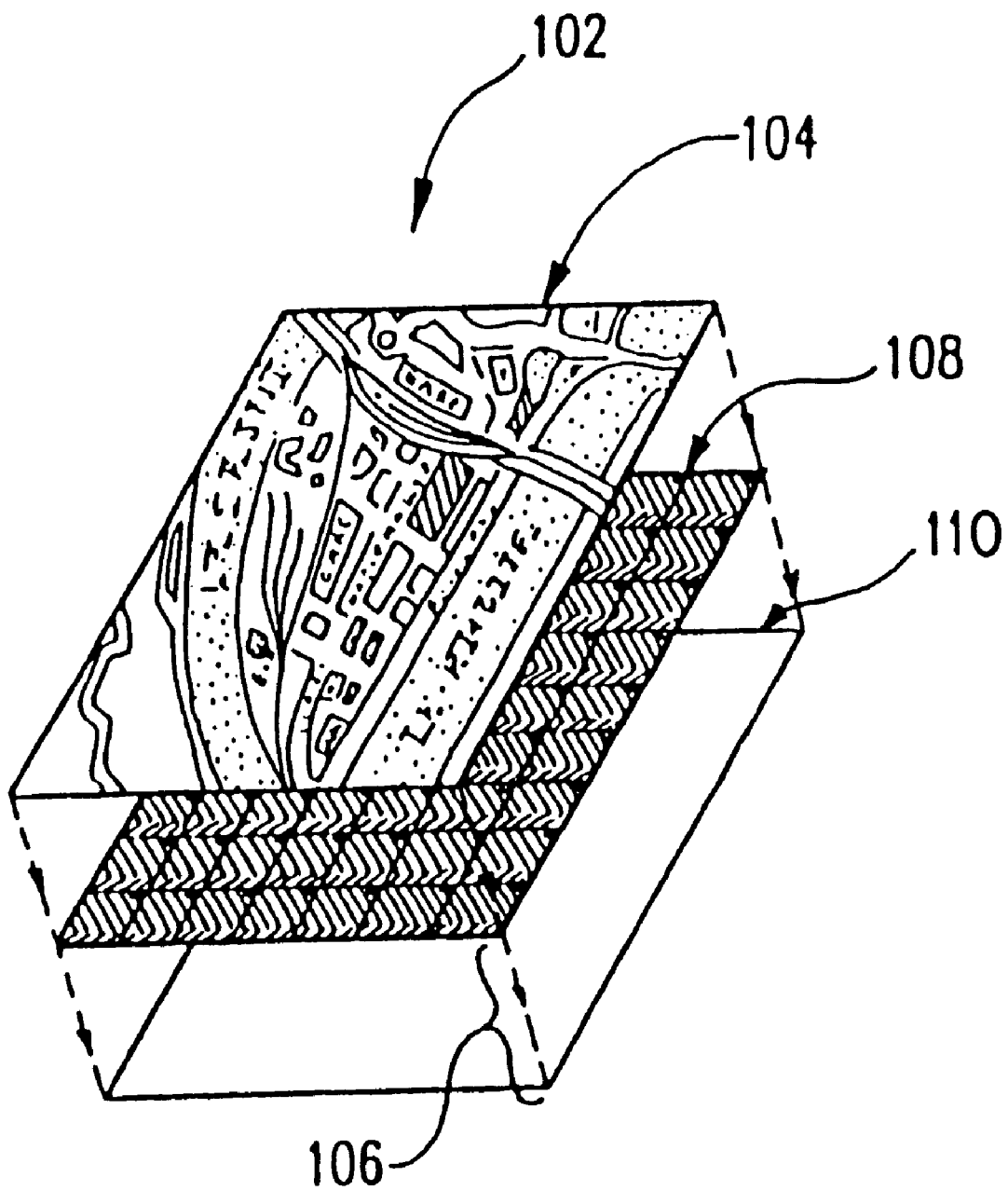
FIG. 1 illustrates components of a document printed on a coded substrate.

The following definitions are helpful in understanding the broad scope of the invention, and the terms defined below have the indicated meanings throughout this application, including the claims.

A "processor" is a component that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

A processor performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "network" is a combination of circuitry through which a connection for transfer of data can be established between machines. The circuitry in a network need not all be connected by transmissive elements such as wires—a network can include wireless links. Various types of machines can be connected to a network, and various terms can be used to refer to such machines; for example, the term "router" can be applied to a machine that responds to items of data by providing network addresses; the term "server" can be applied to a machine that responds to items of data by providing a service.

An "action that can be produced" through a network is any operation that can be produced by providing signals through the network.

A processor "accesses" an item of data in memory by any operation that retrieves or modifies the item or information within the item, such as by reading or writing a location in memory that includes the item.

A processor or other component of circuitry "uses" an item of data in performing an operation when the result of the operation depends on the value of the item. For example, the operation could use the item to access another item of data.

An item of data "indicates" a thing, event, or characteristic when the item has a value that depends on the existence or occurrence of the thing, event, or characteristic or on a measure of the thing, event, or characteristic. An item of data "indicates" another value when the item's value is equal to or depends on the other value.

An item of data "identifies" or "is an identifier of" one of a set of identifiable items if the item of data is one of a set of items of data, each of which can be mapped to at most one of the identifiable items. For example, an "action identifier" is an item of data with a value that can be mapped to at most one of a set of actions, where each action in the set could be a complex action or could be an action that leads to further actions. Specifically, an identifier of a page, referred to herein as a "page identifier" or "pid", can be an action identifier if it identifies an action such as accessing one or more counterpart digital pages. At the same time, the page identifier can serve as part of a number of longer action identifiers, each for a position within a counterpart digital page and each identifying an action for its position.

A "network address" or "address" is an identifier of a machine connected to a network that can be used to establish a connection to the machine.

A network address is "for a value" if the network address is obtained only for that value. A network address is "for a set of values" if the network address is obtained for any of the values in the set.

A "range" is a set of consecutive values with lower and upper bounds.

An "image" is a pattern of physical light, whether in the visible range, in an invisible range, or in a combination of visible and invisible.

Signals "define" an image when the signals include sufficient information to produce the image. "Image input circuitry" is circuitry for obtaining data defining images as input.

A "marking substrate" or "substrate" is a physical medium on which a pattern of marks can be produced, such as by marking or printing actions. Common examples of marking substrates include sheets of paper and plastic. As used herein, "marking" or "mark" includes both visible and invisible marks, and includes a single mark and also plural marks that together form a pattern of marks.

FIG. 1 illustrates components of a document printed on a coded substrate. Printed document 102 comprises layer 104 of printed visible (human-readable) information printed on coded substrate 106, illustratively a segment of a map though layer 104 could include text, photographic images, or any other human-readable information. Coded substrate 106 in turn comprises a layer 108 of visible or invisible machine readable markings printed on a sheet medium 110 (e.g. paper).

Figure 2:
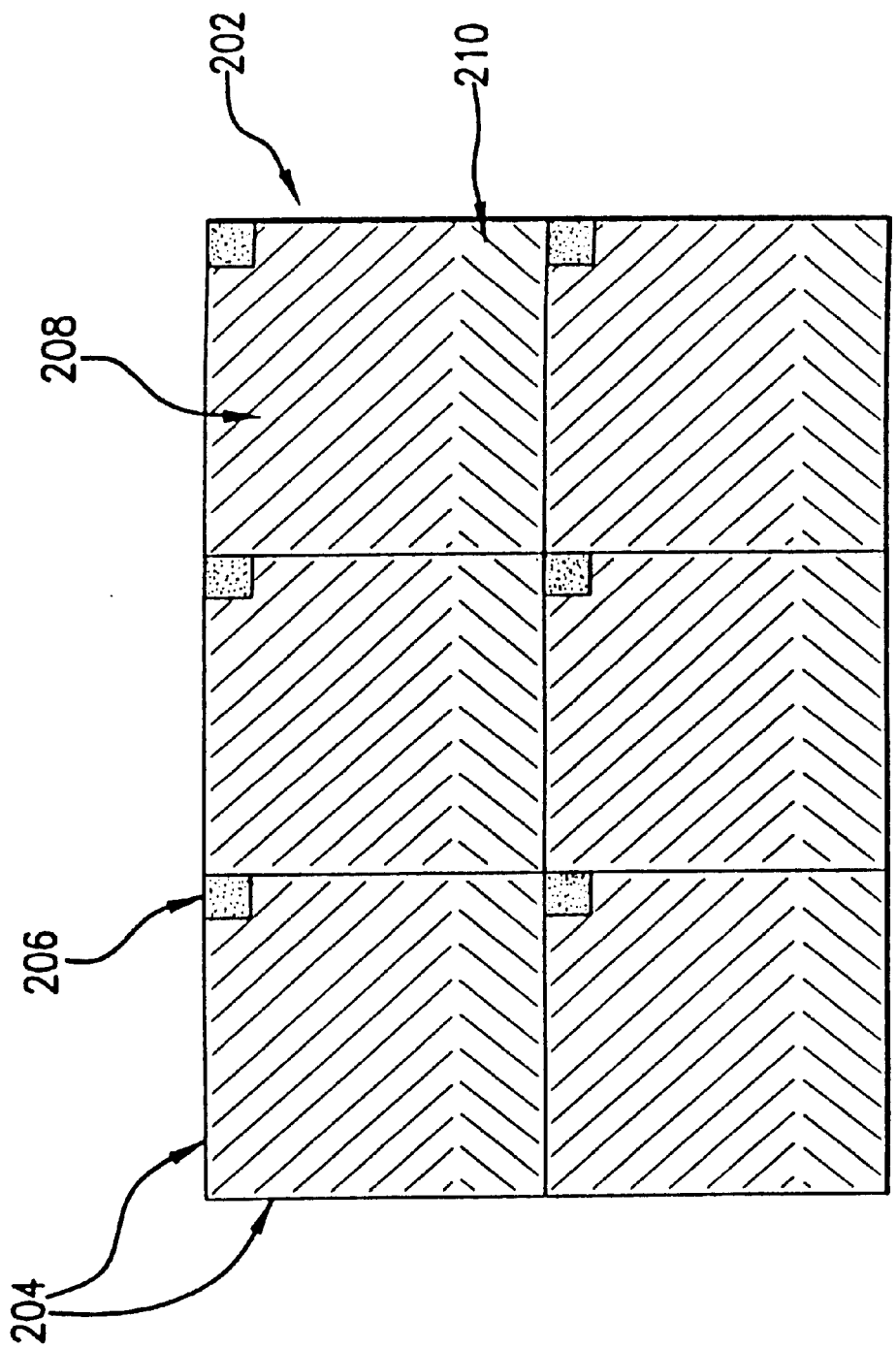
FIG. 2 shows schematically a sample of zones, and the disposition of machine readable markings, on a coded substrate.

FIG. 2 shows a sample of zones or cells, and the disposition of machine readable markings, on a coded substrate, as could be printed in layer 108. Each zone or cell 202 includes a border 204 around its interior and an orientation marker 206, which can be within the interior. A first set of markings 208 over part of the interior of zone or cell 202 is an encoded representation of the pid, while a second set of markings 210 over a possibly smaller part of the interior of zone or cell 202 is an encoded representation of the localization (page-loc)—uniquely defining the position of zone or cell 202 within the page.

Figure 3:
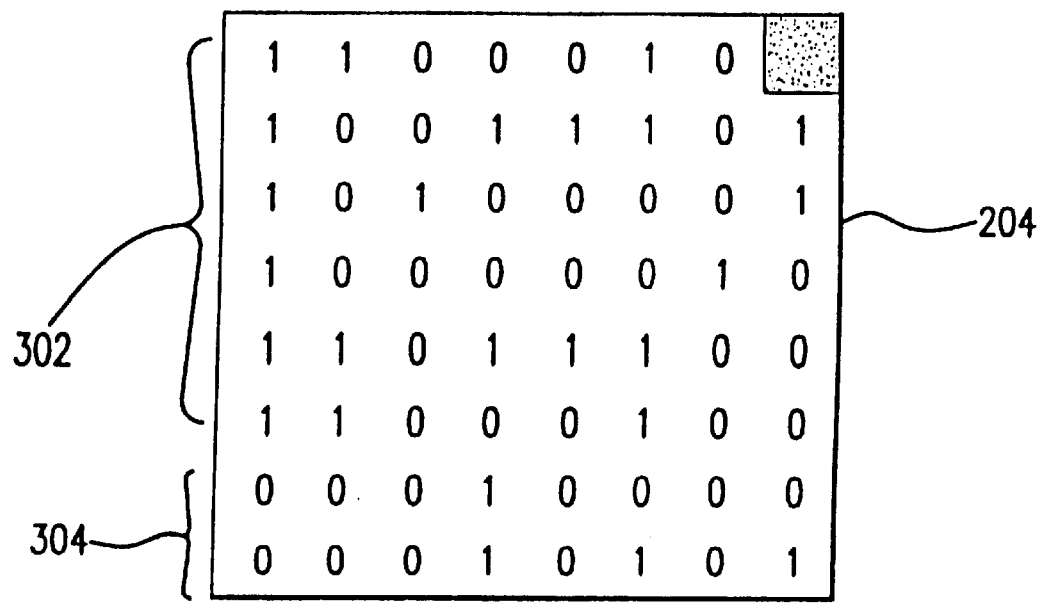
FIGS. 3 and 4 show how digital data can be encoded in markings printed in a zone of the type illustrated in FIG. 2.
Figure 4:
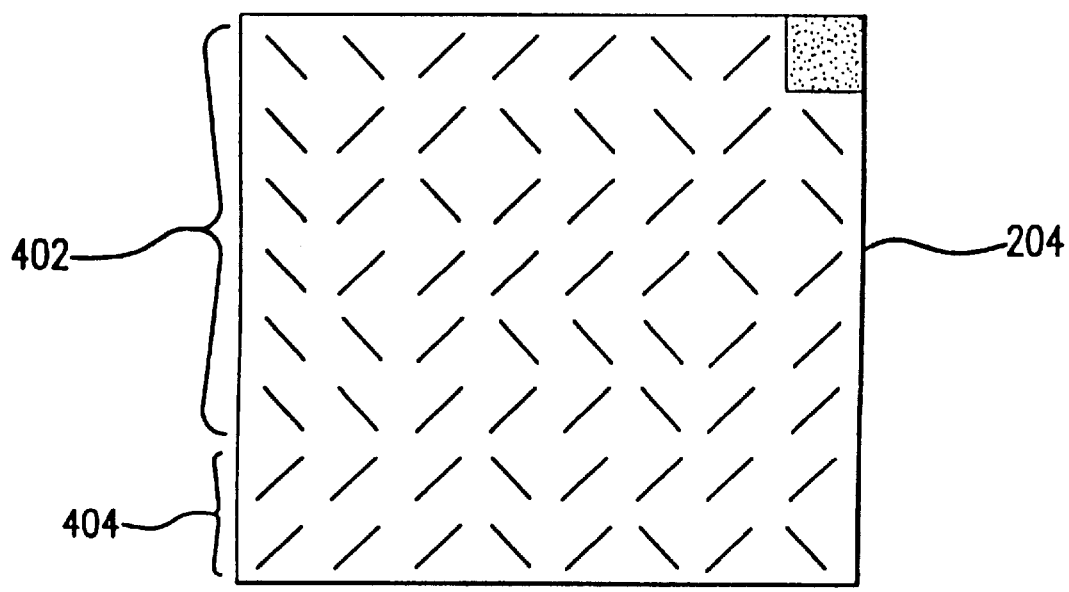

FIGS. 3 and 4 show how digital data can be encoded in a single zone or cell like those illustrated in FIG. 2. FIG. 3 shows the unencoded binary data with each binary value or bit in approximately the position of its encoded representation, i.e. 47 bits of pid in the upper section 302 (the bit stream wraps at border 204), and 16 bits of page localization data (loc) in the lower section 304. The pid code denotes 108429159095492 (decimal)=629DA182DCC4 (hexadecimal)=11000101001110110100001100000 10110111001100010000010000000010101 (binary, to make the wrapping explicit). In the 16 bit loc code in section 304, there are 8 bits for the X coordinate and 8 bits for the Y coordinate. Thus, for the cell (zone) shown, its position is (16, 21) on the substrate.

FIG. 4 shows the same data as in FIG. 3, but represented by DataGlyph markings. Encoding using DataGlyphs and the retrieval of data therefrom is discussed further in US-A-5,486,686, EP-A-469864, and copending, coassigned U.S. Pat. application No. 09/276,085, entitled "Marking Medium Area With Encoded Identifier for Producing Action Through Network", all incorporated herein by reference. Here, a first set of glyphs (markings) in upper section 402 encodes a pid and a second set in lower section 404 encodes a loc. Each glyph encodes the bit at approximately the same position in FIG. 3, so that each glyph extending from upper left to lower right encodes a "1" and each glyph extending from lower left to upper right encodes a "0".

Figure 5:
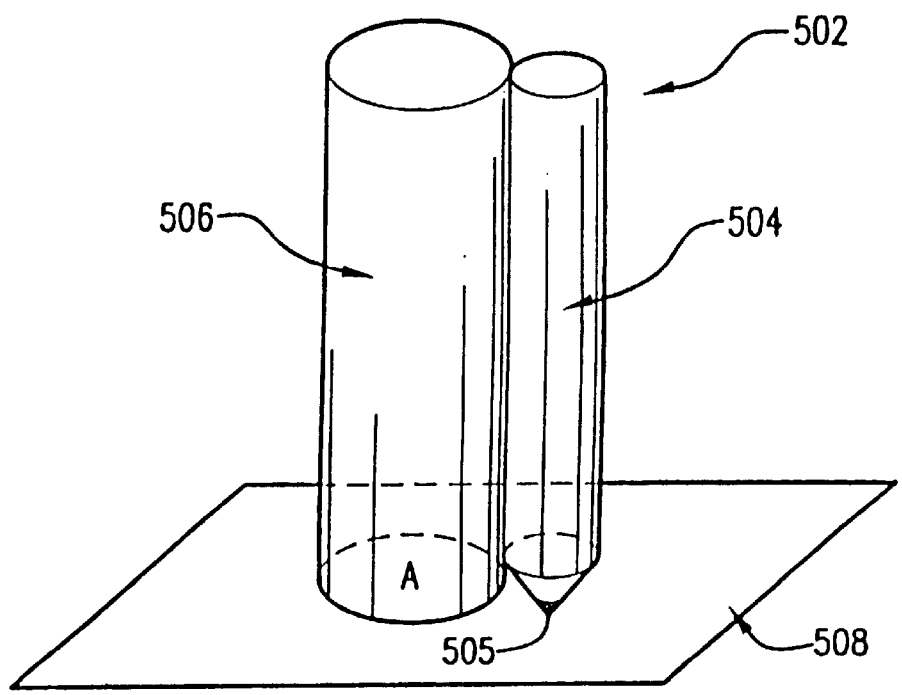
FIG. 5 schematically illustrates features of a pointer.

FIG. 5 schematically illustrates features of a pointer that may be used in implementing the invention. Other examples of image input devices that could be used are described in copending, coassigned U.S. Pat. applications 09/144,250, entitled "Methods and Apparatus for Camera Pen"; 09/144,251, entitled "Glyph Address Carpet Methods and Apparatus for Providing Location Information in a Multidimensional Address Space"; and 09/223,882, entitled "Multi-Level Selection Methods and Apparatus Using Context Identification for Embedded Data Graphical User Interfaces", all incorporated herein by reference.

Pointer 502 comprises pointing device 504, which may have tip 505, and image capture device 506, which can be a camera or another type of image input circuitry. In use, image capture device 506 is able to capture images of an area A of a document 508, which can be implemented with a coded substrate as illustrated in FIGS. 1–4. For the sake of illustration, the sizes of the components of pointer 502 are exaggerated, and pointing device 504 is shown parallel to image capture device 506 although they could be differently oriented—e.g. in practice, area A may be much closer to tip 505 of pointing device 504 than appears in FIG. 5, so that a user can more easily determine from tip 505 where area A is located. In certain implementations, pointing device 504 may be omitted. In others, pointing device 504 may also be a pen or any other marking device suitable for making marks that are visible to a user on a coded substrate.

Document 508 may be a blank coded substrate, or such a substrate having humanreadable information printed thereon.

Figure 6:
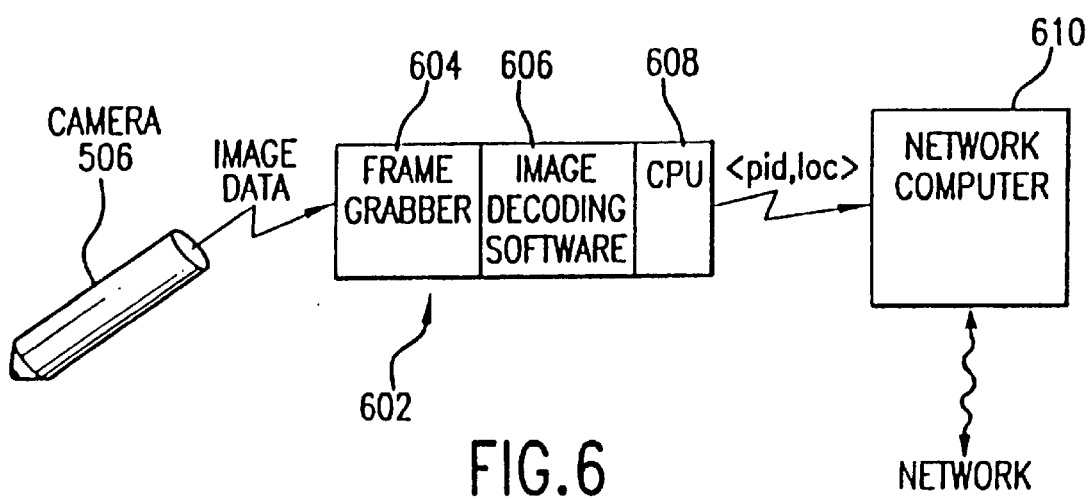
FIG. 6 shows schematically a configuration for passing page identification codes and/or page location codes from the pointer of FIG. 5 to a network computer.

FIG. 6 shows a configuration for passing page identification codes and/or page location codes from image input circuitry as in pointer 502 in FIG. 5 to processing circuitry that includes a network computer. Image capture device 506, illustratively a CCD or other appropriate camera, is coupled by wired or wireless (e.g. IR or RF) link to processing device 602 and in use provides a signal with image data defining captured images to processing device 602. Image capture device 506 and processing device 602 may be combined into a single handheld unit or may be separate components.

The operative elements of processing device 602 include a frame grabber circuit 604, image decoding software 606, and CPU 608, which are known in the art. CPU 608 can execute image decoding software 606 and other conventional software to receive and decode an image from frame grabber circuit 604 and to provide decoded data to other components as described below. Processing device 602 can also include memory, accessible by CPU 608 for storage and retrieval of data.

In use, processing device 602 extracts from the image data the encoded page identifier and page-location data to obtain an item of data (<pid, loc>) and communicates the item of data in a wired or wireless fashion to a local device, illustratively network computer 610 linked to a network such as an intranet or the internet in a known manner. Computer 610 can have its own unique network address, but need not have any information output device like a display screen or printer, because such a device is not necessary to perform the function of providing a connection between CPU 608 and the network. Processing device 602 and computer 610 could therefore both be within pointer 502, and could communicate and share resources through any appropriate circuitry. Computer 610 could, however, perform other functions, in which case it could have a user interface appropriate for those functions.

Figure 7:
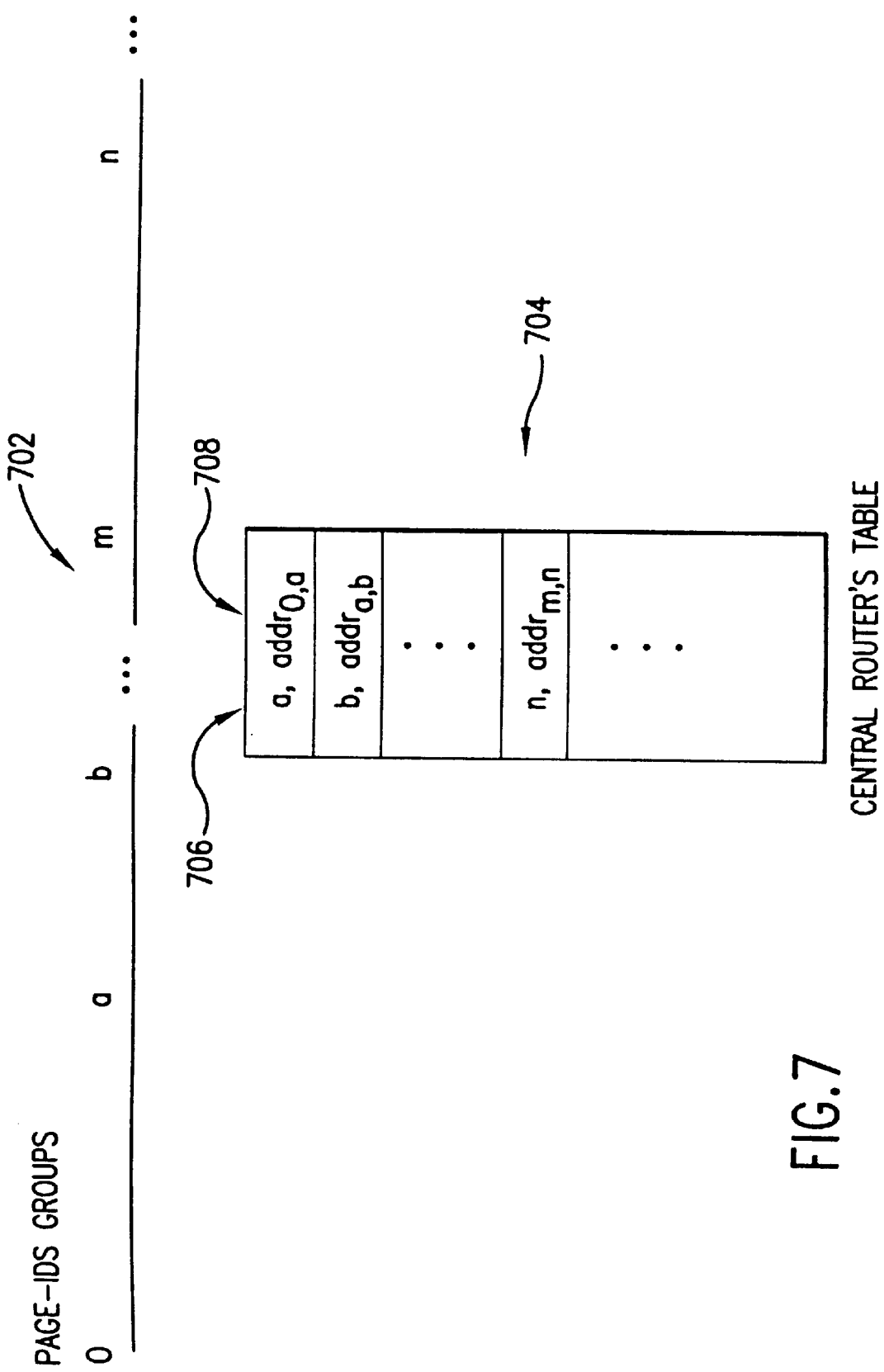
FIG. 7 illustrates an assignment of pid groups and the association of pids and server addresses in a table stored in a router.

FIG. 7 illustrates a table that can be stored in the memory of a machine referred to herein as a central router. In the implementation of FIG. 7, groups of consecutive pids (e.g. 0 to a−1, a to b−1, etc.) form distribution 702, and each group can be encoded in one coded substrate of a batch as it is supplied to a publisher for printing. Table 704 can be stored in another machine connected to the network, referred to herein as a central router computer if the implementation has only one such machine and the relevant function of the machine is to respond to pids by providing network addresses.

Table 704 stores group data 706 indicating groups of consecutive pids and network address data 708, with the two types of data being related in table entries such that table 704 can be accessed using a pid in any of the groups to obtain the group's associated network address. In the illustrated implementation, $addr_{k,l}$ can be the internet address of a server or other machine for pids k through l, where k and l are lower and upper bounds, respectively, of a group of consecutive pids. In the illustrated implementation, each entry of table 704 need include data indicating only the upper bound of the entry's group of pids, since the entry's group includes all pids that are less than the upper bound and at least as great as the preceding entry's upper bound, the first entry beginning with the zeroth pid.

Table 704 thus includes data associating or relating identifier values and network addresses, and can be referred to as "identifier/address data". Identifier/address data could take various forms other than a table, and could be implemented in any appropriate combination of hardware and software.

Figure 8:
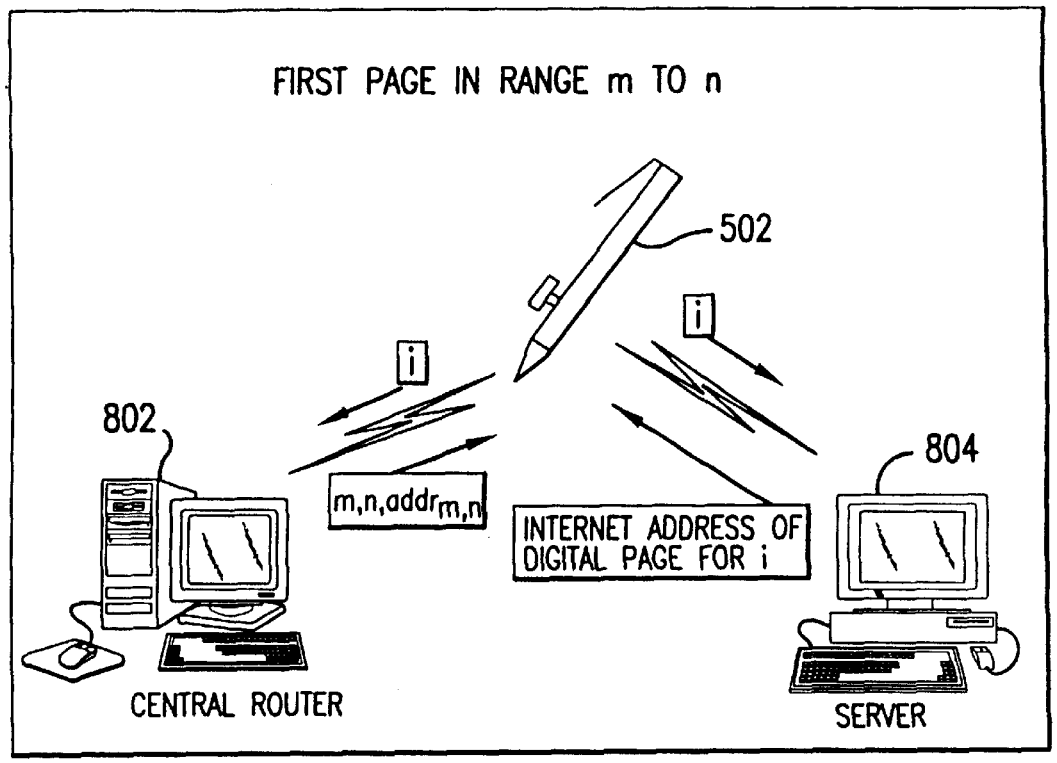
FIG. 8 shows retrieval of an internet address for a first page using a first pid.

FIG. 8 shows schematically how an internet address for a first page could be retrieved using a first pid i, where m and n are the lower and upper bounds of a group of consecutive pids and m≦i<n.

Pointer 502, while pointed at a coded substrate such as document 508, can communicate pid i to central router 802 and to server 804, in a manner described in greater detail below in relation to FIG. 10.

Figure 9:
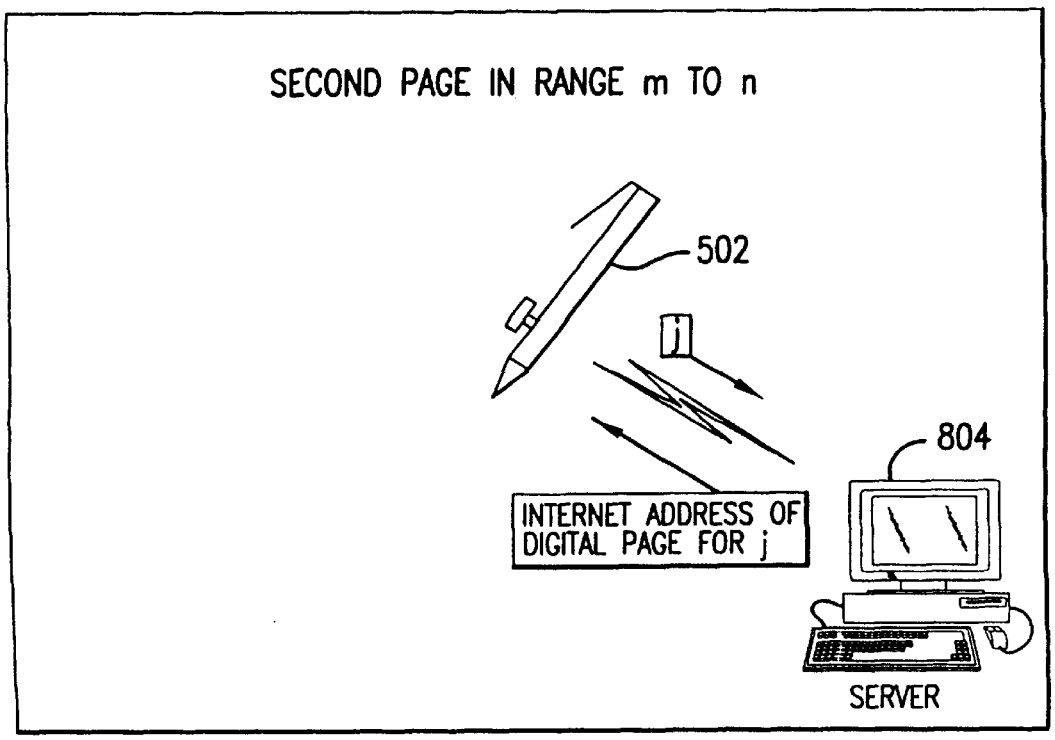
FIG. 9 shows retrieval of an internet address for a second page using a second pid.

FIG. 9 shows schematically how an internet address for a subsequent, second page could be retrieved using a second pid j, where m≦j<n. Here, pointer 502 communicates page-id j only to server 804, and need not communicate with central router 802.

Figure 10:
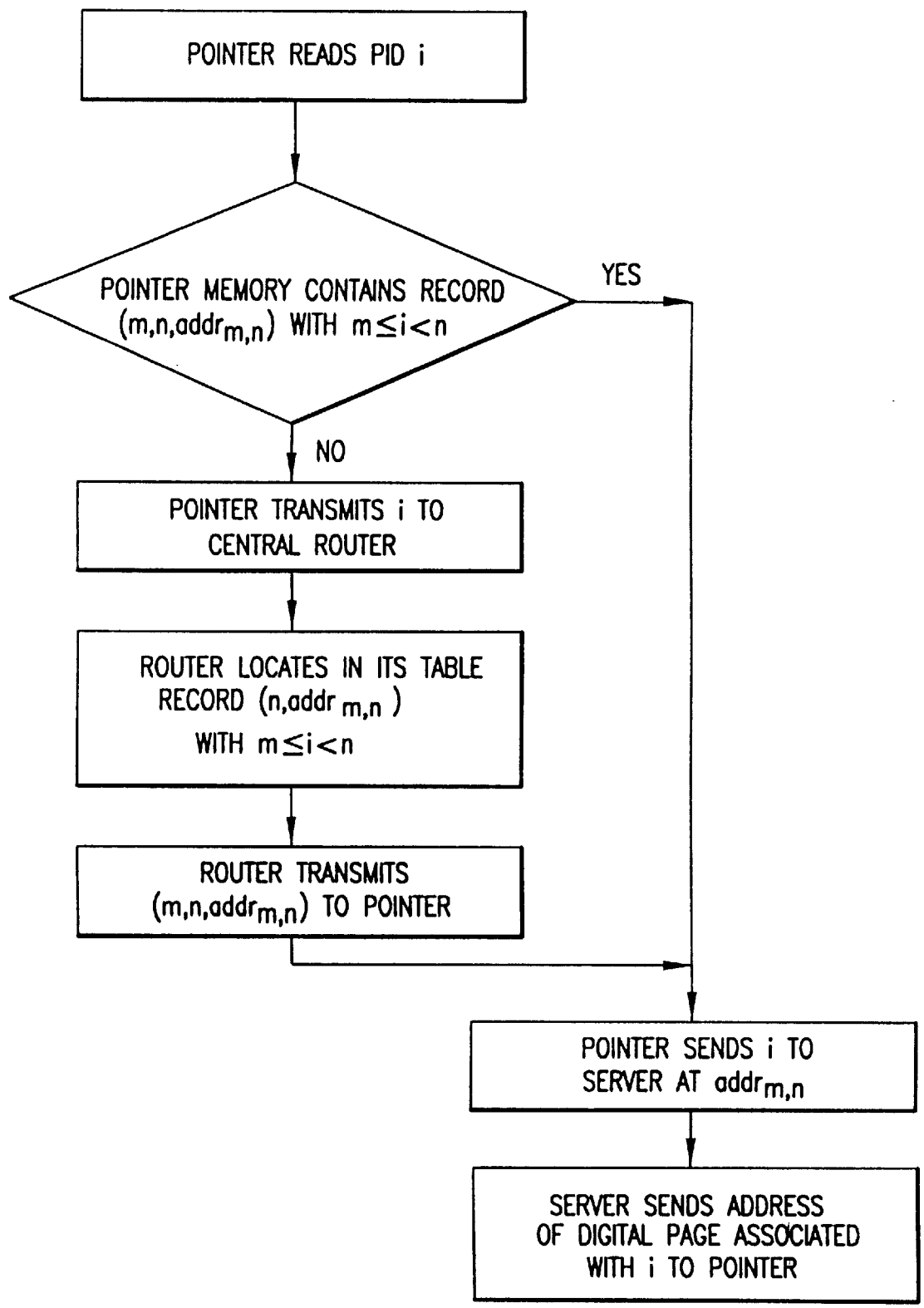
FIG. 10 is a flow chart of acts implementing retrieval as in FIGS. 8 and 9.

FIG. 10 shows acts implementing retrieval as in FIG. 8, and also shows how retrieval as in FIG. 9 would be performed. In the first box in FIG. 10, pointer 502 reads a page whose pid is i where m≦i<n; in FIG. 9, this act would read a page whose pid is j where m≦j<n. In the second box in FIG. 10, CPU 608 determines whether a memory in pointer 502 contains a cached record indicating the lower and upper bounds m and n of a group of consecutive identifier values and a network address $addr_{m,n}$ for the group, where m≦i<n. If not, as would be the case if this were the first page with a pid in the range m to n, pointer 502 requires information from central router 802 in order to obtain the group's network address. Therefore, the acts in the third through fifth boxes in FIG. 10 are performed to implement retrieval as in FIG. 8.

In the third box in FIG. 10, pointer 502 transmits the pid value i to central router 802, as shown in FIG. 8. To do so, pointer 502 can use a stored network address of central router 802 and can also provide its own network address for use by central router 802 in replying. In response, in the fourth box, central router 802 uses the pid value i to locate in table 704 a record (n, $addr_{m,n}$) such that m≦i <n. As can be understood from FIG. 7, central router 802 can locate this record by successively accessing each entry in table 704, comparing the upper bound value n in the entry with the pid value i, saving each upper bound value n for use with the next entry until an entry is reached for which the upper bound value n exceeds i; the network address $addr_{m,n}$ from this entry together with the upper bound values of the entry and the preceding entry can then be used to obtain an item of data (m, n, $addr_{m,n}$). In the fifth box, Central router 802 then uses the network address of pointer 502 to transmit the item of data (m, n, $addr_{m,n}$) to pointer 502, as also shown in FIG. 8. In response, pointer 502 stores the values from the item of data (m, n, $addr_{m,n}$) as a cached record in its memory.

In the sixth box in FIG. 10, pointer 502 then transmits pid i to server 804 at network address $addr_{m,n}$ as shown in FIG. 8, together with its own network address for use by server 804 in replying. In the implementation of FIG. 9, this act is also performed by transmitting pid j to server 804 at network address $addr_{m,n}$, but $addr_{m,n}$ is obtained from the cached record found in the second box in FIG. 10. In either implementation, server 804 responds by using the network address of pointer 502 to transmit the internet address of the digital page for i (or j) to pointer 502, as shown in FIGS. 8 and 9. Pointer 502 can then use the internet address to interact with the digital page.

Variations

The implementations described above could be varied in many ways within the scope of the invention.

The implementations described above provide page identifiers and locations, but the invention could be implemented with other types of action identifiers, including other types of substrate identifiers and document identifiers, and without providing locations.

In implementations described above, each set of identifiers includes a range of consecutive identifiers, but identifiers could be grouped in various other ways, such as based on having particular combinations of values in certain bits. Also, in implementations described above, each range is bounded by a lower bound that is the value of an identifier in the range and by an upper bound that is the lower bound of another range; ranges could be bounded in various other ways, such as by lower and upper bounds that are both within the range or both outside the range, or by lower bounds that are outside the range and upper bounds that are within the range.

The implementations described above use a pointer to read markings on a coded substrate and provide identifiers, but action identifiers could be obtained from any other appropriate image input circuitry, and could also be obtained from sources other than image input circuitry. For example, identifiers could be obtained from a mobile phone or other user input device that can provide signals. Furthermore, identifiers from a substrate need not be encoded prior to printing human-readable information, as in the implementations described above, but could be included as part of the printing of one or more layers of human-readable information or could be subsequently printed. A substrate bearing markings need not be paper, but could be any medium suitable for marking. The markings need not be Data Glyphs as described above, but could be any type of markings suitable for encoding identifiers on substrates.

In implementations described above, identifiers are provided to a router through a linked combination of components that includes a pointer, a CPU, a network computer, and a network, but any other appropriate circuitry could provide identifiers to a first machine within the scope of the invention, and the described components could be provided through any appropriate combination of hardware and software. For example, processing could all be performed within the pointer, could all be performed outside the pointer such as in the network computer, or could be performed in any other appropriate manner. Furthermore, the first machine of the invention need not be a router, but could be any machine capable of using an identifier to obtain a network address.

Similarly, in implementations described above, a network address from a router is used to provide an identifier to a server, but the second machine of the invention need not be a server, but could be any machine capable of using the identifier to obtain a network address that, when provided on the network, produces the action identified by the value of the identifier; for example, the second machine could be a router. In general, the use of a network address to provide an item of data to a component through a network can be done in any appropriate way, including the use of further intermediate machines for routing of messages.

In implementations described above, a router returns a network address to the pointer, which can then use the network address to provide an identifier to a server. The router could also, however, use the network address to provide an identifier directly to the server rather than returning it to the pointer. Similarly, in implementations described above, a server returns a network address to the pointer, which can then use the network address to obtain an action. The server could similarly use the network address to obtain the action directly rather than returning it to the pointer.

Further, in implementations described above, two machines—a centralized router and a server—are used to obtain a network address for an identifier, but three or more machines could be used, with each machine except the last obtaining a network address for the next machine.

Similarly, the implementations described above include one centralized router, but it would be within the scope of the invention to provide several mirror sites for the router. More specifically, in the described implementations, there is one central router whose address is a priori stored in each pointer, and identifiers are sent to this router by the pointer. There could alternatively be several, e.g. 10, mirror routers that each contain the same information as the single central router would. Each mirror router could function as a copy of the central router, but at a different geographical location. The addresses of the 10 mirror routers could be a priori known to the pointers. When a pointer sends an identifier to a router, it is indifferent which router receives and handles the identifier. The pointer can choose a router randomly among the 10 it knows. If all pointers do the same, this has the net effect of dividing by 10 the number of requests that each router has to answer on average each day. This would also have the effect of making a more efficient use of the network communication channels.

It will be appreciated that the techniques described herein may also be used in conjunction with the related techniques described in copending, coassigned U.S. Pat. application Nos. 09/276,085, entitled "Marking Medium Area With Encoded Identifier for Producing Action Through Network", and 09/276,532, entitled "Obtaining and Using Data Associating Annotating Activities with Portions of Recording", both incorporated herein by reference.

In implementations described above, specific acts are performed that could be omitted or performed differently. For example, it is not necessary to provide locations to implement this invention, although an action identifier can include both a page identifier and a location identifier. The invention could also be implemented without caching, but caching is advantageous for the reasons set forth above.

In implementations described above, acts are performed in an order that could be modified in some cases.

Implementations described above use currently available computing techniques, but could readily be modified to use newly discovered computing techniques as they become available.

Applications

The invention could be applied in various ways.

For example, the invention may be applied as follows:

1. Publisher P could buy p coded substrates from supplier X. P provides the net address A of a server belonging to P.

2. X has previously altogether sold m coded substrates to other publishers (or to P). The previously sold sheets have been given page-ids (pids) ranging from 0 to m−1. X produces p new coded substrates, numbered from m to n=m+p−1.

3. X installs number n as a key in its central router database (it is assumed that number m was previously installed in a similar way), and associates with this key the address $addr_{m,n}=A$ provided by P for these p pages (see FIG. 8).

4. At a later time, a user clicks his/her pointer at one of these p sheets and reads a pid in the range from m to n for the first time. This results in the pid of this sheet being sent to X's central router. The central router returns to the pointer a record $(m,n,addr_{m,n})$, where m, n, and $addr_{m,n}$ are as above. This triple is stored in the pointer's memory (see FIG. 8). Unless pointers cooperate by storing or caching these triples, some of the efficiencies described above cannot be realized. Caching behaviour can be enforced through a priori specification or through some "punishing" scheme for uncooperative pointers. Also, because the pointer has limited memory, it may have to expel a previously stored record in order to perform caching, according to an appropriate criterion such as least recently used or least frequently used.

5. The pointer sends the pid i (a number between m and n) to the address $addr_{m,n}$. The final routing of the pid is now the responsibility of the publisher's server at $addr_{m,n}$, which can, for example, retrieve the digital page associated with pid i (see FIG. 8).

6. If, at a later stage, the same pointer clicks on any page having a pid j in the range from m to n, then the pointer consults its memory first, and notices that it contains the record $(m,n,addr_{m,n})$. Rather than now consulting the central router, it consults directly the publisher's server at address $addr_{m,n}$ (see FIG. 9).

The invention achieves two main advantages in this application:

1. In the central router, only one entry needs to be stored for each batch or bulk purchase of coded substrates.

2. If a customer, such as a journal publisher, buys in a single purchase enough sheets for a year or other lengthy period of publication, a subscriber to the journal will only need to access the central router once in a year; the first request to the router can result in caching the whole range of pages for a year of the journal. Because of this tendency for users to click repeatedly on pages belonging to the same sheet batch, the number of requests per day to the central router could diminish dramatically.

The routing fee charged by X to the publishers can promote the scheme by being regressive relative to the number of sheets bought in a single purchase by a publisher. The rationale behind this regressive cost is the fact that the routing costs associated with two separate purchases by the same publisher of p and then p' sheets, associated with two publisher servers A and A', are higher than the routing costs associated with a single purchase of p+p' sheets associated with a single publisher server A. This difference is especially large if the fact that a pointer has "seen" the first batch significantly increases its probability of seeing the second one sometime in the future (as compared to the a priori probability of seeing the second batch). It will be appreciated that these principles could be repeated recursively: the publisher's server itself could be organized in a way similar to the central router.

The invention could also be applied by marketing sets or ranges of identifier values, whether or not coded substrates are also provided. A purchaser of a set of identifier values could market or otherwise provide one of the purchased values to an end user to enable the end user to obtain services through a network, such as storage services, hyperlink services, and so forth. The seller of the set of identifier values could provide a first machine on a network that would use an identifier value to obtain a first network address, but the purchaser of the set would provide a second machine on the network at the first network address. The second machine would use the identifier value to obtain a second network address and could also provide the services.

Miscellaneous

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method for mapping an identifier to a corresponding network address, comprising:

(A) providing the identifier to a first machine connected to a network; the identifier indicating a value;

(B) operating the first machine to use the identifier to obtain a first network address; the first network address being an address on the network of a second machine, the second machine mapping any of a set of two or more identifier values to network addresses, the set including the value indicated by the identifier;

(C) using the first network address to provide the identifier to the second machine through the network; and (D) operating the second machine to use the identifier to obtain a second network address; the second network address being the network address corresponding to the identifier.

2. The method of claim 1 in which the first machine is a router and the second machine is a server.

3. The method of claim 1, in which the identifier's value identifies an action that can be produced through the network and in which (A) comprises:

operating image input circuitry to provide image signals defining an image of a region of a marking substrate to a third machine, the region of the marking substrate bearing markings that encode a substrate identifier; and operating the third machine to use the image signals to obtain the identifier and to use a third network address to provide the identifier and a return network address to the first machine;

and in which (B) comprises:

operating the first machine to use the return network address to provide the first network address to the third machine;

and in which (C) comprises:

operating the third machine to use the first network address to provide the identifier and the return network address to the second machine;

and in which (D) comprises:

operating the second machine to use the return network address to provide the second network address to the third machine;

the method further comprising:

(E) operating the third machine to use the second network address to produce the action identified by the identifier's value.

4. The method of claim 3 in which the third machine includes a memory and in which, in (B), the first machine further provides set data defining the set of identifier values that includes the identifier's value, and in which (C) further comprises:

operating the third machine to store the set data and the first network address in the memory so that the third machine can subsequently access the first network address using any identifier value in the set of identifier values that includes the identifier's value.

5. The method of claim 3 in which the third machine is a pointer.

6. The method of claim 1 in which the first machine includes:

identifier/address data that can be accessed with an identifier value in one of a number of sets of identifier values to obtain a network address for the set that includes the identifier's value; and processing circuitry connected for accessing the identifier/address data;

and in which (B) comprises:

operating the processing circuitry to use the identifier's value to access the identifier/address data and obtain the first network address.

7. The method of claim 6 in which each of the sets of identifier values is a range of consecutive values, the identifier/address data including range bound data indicating the lower and upper bounds of each range and in which (B) further comprises:

operating the processing circuitry to use the identifier's value and the range bound data to determine whether one of the sets of identifier values includes the identifier's value.

8. An apparatus for mapping an identifier to a corresponding network address, comprising:

connection circuitry for providing a connection to the network; and processing circuitry connected for providing signals to and receiving signals from the network through the connection circuitry; the processing circuitry operating to:

provide the identifier through the connection circuitry to a first machine connected to the network; the identifier indicating a value; in response, the first machine using the identifier to obtain a first network address; the first network address being an address on the network of a second machine, the second machine mapping any of a set of two or more identifier values to network addresses, the set including the value indicated by the identifier; and use the first network address to provide the identifier through the connection circuitry to the second machine; in response, the second machine using the identifier to obtain a second network address; the second network address being the corresponding network address for the identifier.

9. The apparatus of claim 8, further comprising:

image input circuitry connected to provide image signals defining an image of a region of a marking substrate to the processing circuitry, the region of the marking substrate bearing markings that encode a substrate identifier;

in response to the image signals, the processing circuitry operating to: use the image signals to obtain the identifier.

10. The apparatus of claim 8, further comprising network address data indicating a third network address and a return network address;

the processing circuitry, in providing the identifier to the first machine:

accessing the network address data to obtain the third network address and the return network address; and using the third network address to provide the identifier and the return network address to the first machine; in response, the first machine using the return network address to provide the first network address to the processing circuitry through the network and the connection circuitry;

the processing circuitry, in providing the identifier to the second machine:

accessing the network address data to obtain the return network address; and using the first network address to provide the identifier and the return network address to the second machine; in response, the second machine using the return network address to provide the second network address to the processing circuitry through the network and the connection circuitry.

11. The apparatus of claim 8 in which the identifier's value identifies an action that can be produced through the network and in which the processing circuitry further operates to use the second network address to produce the action identified by the identifier's value.

12. The apparatus of claim 8, further comprising a memory; the first machine, in response to the identifier, further providing set data defining the set of identifier values that includes the identifier's value; the processing circuitry:

storing the set data and the first network address in the memory so that the first network address can be accessed using any identifier value in the set of identifier values that includes the identifier's value.

13. The apparatus of claim 12 in which each of the sets of identifier values is a range of consecutive values, the set data indicating lower and upper bounds of the set of identifier values that includes the identifier's value; the processing circuitry:

upon obtaining a subsequent identifier, accessing the set data to obtain the upper and lower bounds; and using the subsequent identifier's value and the upper and lower bounds to determine whether the set data indicate a network address for the subsequent identifier;

the processing circuitry providing the subsequent identifier to the first machine if the set data do not indicate a network address for the subsequent identifier.

* * * * *